United States Patent
Sasaki

(10) Patent No.: US 11,208,523 B2
(45) Date of Patent: Dec. 28, 2021

(54) POLYCARBODIIMIDE COMPOUND AND THERMOSETTING RESIN COMPOSITION

(71) Applicant: NISSHINBO CHEMICAL INC., Tokyo (JP)

(72) Inventor: Takahiro Sasaki, Chiba (JP)

(73) Assignee: NISSHTNBO CHEMICAL INC., Tokyo (JP)

( * ) Notice: Subject to any disclaimer, the term of this patent is extended or adjusted under 35 U.S.C. 154(b) by 0 days.

(21) Appl. No.: 16/641,400

(22) PCT Filed: Aug. 24, 2018

(86) PCT No.: PCT/JP2018/031428
§ 371 (c)(1),
(2) Date: Feb. 24, 2020

(87) PCT Pub. No.: WO2019/044719
PCT Pub. Date: Mar. 7, 2019

(65) Prior Publication Data
US 2020/0181314 A1    Jun. 11, 2020

(30) Foreign Application Priority Data

Aug. 28, 2017  (JP) .............................. JP2017-163552

(51) Int. Cl.
| | | |
|---|---|---|
| *C08G 18/71* | (2006.01) | |
| *C08G 18/09* | (2006.01) | |
| *C08G 18/76* | (2006.01) | |
| *C08G 59/40* | (2006.01) | |
| *C08L 63/00* | (2006.01) | |

(52) U.S. Cl.
CPC ............. *C08G 18/71* (2013.01); *C08G 18/09* (2013.01); *C08G 18/7671* (2013.01); *C08G 59/4042* (2013.01); *C08L 63/00* (2013.01)

(58) Field of Classification Search
CPC .... C08G 18/71; C08G 18/09; C08G 18/7671; C08G 59/4042; C08L 63/00
USPC ....................................................... 525/528
See application file for complete search history.

(56) References Cited

U.S. PATENT DOCUMENTS

| | | | |
|---|---|---|---|
| 6,153,718 A | 11/2000 | Imashiro et al. | |
| 2017/0253693 A1 | 9/2017 | Shoji et al. | |
| 2019/0194381 A1 | 6/2019 | Shoji et al. | |

FOREIGN PATENT DOCUMENTS

| | | |
|---|---|---|
| CN | 1970632 A | 5/2007 |
| CN | 105940052 A | 9/2016 |
| CN | 106715578 A | 5/2017 |
| JP | 62-1714 A | 1/1987 |
| JP | 4-261428 A | 9/1992 |
| JP | 10-7794 A | 1/1998 |
| JP | 10-7984 A | 1/1998 |
| JP | 10-8396 A | 1/1998 |

OTHER PUBLICATIONS

Murata et al., JP 10007984 A machine translation in English, Jan. 13, 1998 (Year: 1998).*
International Search Report, issued in PCT/JP2018/031428, dated Nov. 13, 2018.
Written Opinion of the International Searching Authority, issued in PCT/JP2018/031428, dated Nov. 13, 2018.
Japanese Office Action for Japanese Application No. 2017-163552, dated Jun. 1, 2021.
Chinese Office Action and Search Report for Chinese Application No. 201880055272.8, dated Jun. 28, 2021.
Xiaoyan et al., "Synthesis and Application Characteristics of Carbodiimide Crosslinking Agent," China Leather, vol. 36, No. 23, Dec. 2007, pp. 36-39, with English abstract.

* cited by examiner

*Primary Examiner* — David T Karst
(74) *Attorney, Agent, or Firm* — Birch, Stewart, Kolasch & Birch, LLP

(57) ABSTRACT

A polycarbodiimide compound represented by the following general formula (1):

[Formula 1]

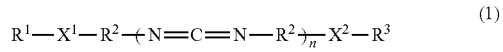

wherein $R^1$ and $R^3$ are defined in the specification; $R^2$ comprises a group represented by formula (i) or (ii) as defined in the specification; the proportion of the groups represented by the formula (i) relative to all the $R^2$ groups in the polycarbodiimide compound is 30 to 70 mol %, and the proportion of the groups represented by the formula (ii) relative to all the $R^2$ groups in the polycarbodiimide compound is 30 to 70 mol %; $X^1$ and $X^2$ each represent a group formed by the reaction of the organic compound and isocyanate, and $X^1$ and $X^2$ may be the same as or different from each other; and n represents an integer of 2 to 50.

5 Claims, No Drawings

POLYCARBODIIMIDE COMPOUND AND THERMOSETTING RESIN COMPOSITION

TECHNICAL FIELD

The present invention relates to a polycarbodiimide compound and a thermosetting resin composition comprising the polycarbodiimide compound.

BACKGROUND ART

Polycarbodiimide compounds have been conventionally used in various applications such as molding materials, resin modifiers and adhesives because they are excellent in heat resistance and the like.

Each of the polycarbodiimide compounds has been produced by subjecting an organic diisocyanate or an organic diisocyanate and an organic monoisocyanate to decarboxylation reaction in the presence of a carbodiimidization catalyst. For example, in Patent Literature 1, a polycarbodiimide has been obtained by subjecting 100 parts by mol of 4,4'-diphenylmethane diisocyanate and 5 to 25 parts by mol of an organic monoisocyanate to decarboxylation reaction in the presence of a carbodiimidization catalyst. In Patent Literature 2, a polycarbodiimide has been obtained by subjecting 2,4'-diphenylmethane diisocyanate in an amount of 5 mol % or more of starting organic diisocyanates and monoisocyanate in an amount of 2 to 25 mol relative to 100 mol of the organic diisocyanate to decarboxylation reaction in the presence of a carbodiimidization catalyst.

CITATION LIST

Patent Literatures

PTL 1: JP 04-261428 A
PTL 2: JP 10-7794 A

SUMMARY OF INVENTION

Technical Problem

When 100% of 4,4'-diphenylmethane diisocyanate has been used as a raw organic diisocyanate to produce a polycarbodiimide as described in Patent Literature 1, the resulting polycarbodiimide has had a problem that it is likely to gelate due to its stacking interaction, resulting in a reduction in storage stability. Such a polycarbodiimide has also had a problem that its solubility in a solvent is significantly low due to its crystallinity derived from the raw material and cannot be thereby used in applications in which solvents are used.

The polycarbodiimide obtained by the production method described in Patent Literature 2 has been described to be able to improve flexibility without any decrease in heat resistance. However, storage stability and solubility in a solvent of such a polycarbodiimide have not been sufficiently studied.

The present invention has been accomplished in view of such actual circumstances. An object of the present invention is to provide a polycarbodiimide compound which is excellent in storage stability, has a high solubility in a solvent and has a suppressed reactivity at a low temperature when used as a curing agent for epoxy resins or the like, and a thermosetting resin composition comprising the polycarbodiimide compound.

Solution to Problem

The present inventors have made intensive studies for solving the above problems, and as a result, have found that the problems can be solved by the present invention described below.

That is, the disclosure of the present patent application relates to the following.

[1] A polycarbodiimide compound represented by the following general formula (1):

[Formula 1]

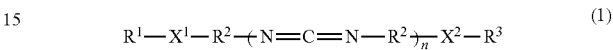

wherein $R^1$ and $R^3$ each represent a residue of an organic compound having one isocyanate-reactive functional group but excluding the isocyanate-reactive functional group, and $R^1$ and $R^3$ may be the same as or different from each other; $R^2$ comprises a group represented by the following formula (i), which is a divalent residue of 2,4'-diphenylmethane diisocyanate having isocyanate groups removed therefrom, and a group represented by the following formula (ii), which is a divalent residue of 4,4'-diphenylmethane diisocyanate having isocyanate groups removed therefrom; the proportion of the groups represented by the formula (i) relative to all the $R^2$ groups in the polycarbodiimide compound is 30 to 70 mol %, and the proportion of the groups represented by the formula (ii) relative to all the $R^2$ groups in the polycarbodiimide compound is 30 to 70 mol %; $X^1$ and $X^2$ each represent a group formed by the reaction of the organic compound and isocyanate, and $X^1$ and $X^2$ may be the same as or different from each other; and n represents an integer of 2 to 50.

[Formula 2]

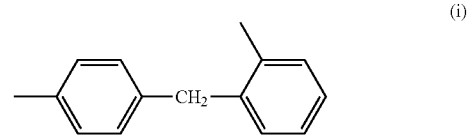

[Formula 3]

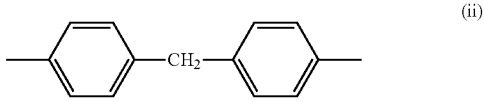

[2] The polycarbodiimide compound according to [1], wherein the proportion of the groups represented by the formula (i) relative to all the $R^2$ groups in the polycarbodiimide compound is 50 to 60 mol %; and the proportion of the groups represented by the formula (ii) relative to all the $R^2$ groups in the polycarbodiimide compound is 40 to 50 mol %.

[3] The polycarbodiimide compound according to [1] or [2], wherein the organic compound having one isocyanate-reactive functional group is at least one selected from the group consisting of a monoisocyanate, a monoalcohol, a monoamine, a monocarboxylic acid and an acid anhydride.

[4] The polycarbodiimide compound according to [3], wherein the organic compound having one isocyanate-reactive functional group is a monoisocyanate.

[5] A thermosetting resin composition comprising an epoxy resin and the polycarbodiimide compound according to any one of [1] to [4].

Advantageous Effects of Invention

According to the present invention, a polycarbodiimide compound which is excellent in storage stability, has a high solubility in a solvent and has a suppressed reactivity at a low temperature when used as a curing agent for epoxy resins or the like, and a thermosetting resin composition comprising the polycarbodiimide compound can be provided.

DESCRIPTION OF EMBODIMENTS

[Polycarbodiimide Compound]

The polycarbodiimide compound is characterized by being represented by the following general formula (1);

[Formula 4]

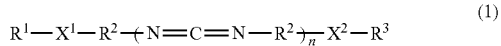

(1)

wherein $R^1$ and $R^3$ each represent a residue of an organic compound having one isocyanate-reactive functional group but excluding the isocyanate-reactive functional group, and $R^1$ and $R^3$ may be the same as or different from each other; $R^2$ comprises a group represented by the following formula (ii), which is a divalent residue of 2,4'-diphenylmethane diisocyanate having isocyanate groups removed therefrom, and a group represented by the following formula (ii), which is a divalent residue of 4,4'-diphenylmethane diisocyanate having isocyanate groups removed therefrom; the proportion of the groups represented by the formula (i) relative to all the $R^2$ groups in the polycarbodiimide compound is 30 to 70 mol %, and the proportion of the groups represented by the formula (ii) relative to all the $R^2$ groups in the polycarbodiimide compound is 30 to 70 mol %; $X^1$ and $X^2$ each represent a group formed by the reaction of the organic compound and isocyanate, and $X^1$ and $X^2$ may be the same as or different from each other; and n represents an integer of 2 to 50.

[Formula 5]

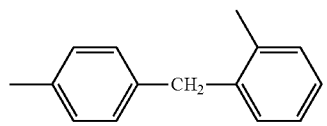

(i)

[Formula 6]

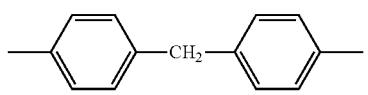

(ii)

In the above general formula (1), $R^1$ and $R^3$ each represent a residue of an organic compound having one isocyanate-reactive functional group but excluding the isocyanate-reactive functional group, and $R^1$ and $R^3$ may be the same as or different from each other. The organic compound having one isocyanate-reactive functional group (hereinafter, also simply referred to as "organic compound") is not particularly limited as long as it has one isocyanate-reactive functional group. However, it is preferably at least one selected from the group consisting of a monoisocyanate, a monoalcohol, a monoamine, a monocarboxylic acid and an acid anhydride from the viewpoint of the reactivity, and it is more preferably a monoisocyanate from the viewpoint of increasing the proportion of the carbodiimide group contained in the polycarbodiimide compound.

Examples of the monoisocyanate include a lower alkyl isocyanate such as methyl isocyanate, ethyl isocyanate, propyl isocyanate, or n-, sec- or tert-butyl isocyanate; a cycloaliphatic aliphatic isocyanate such as cyclohexyl isocyanate; and an aromatic isocyanate such as phenyl isocyanate, tolyl isocyanate, dimethylphenyl isocyanate or 2,6-diisopropylphenyl isocyanate. Among them, phenyl isocyanate and tolyl isocyanate are preferred, and phenyl isocyanate is more preferred from the viewpoint of the reactivity. These may be used alone or in combination of two or more.

Examples of the monoalcohol include methanol, ethanol, cyclohexanol, polyethylene glycol monomethyl ether and polypropylene glycol monomethyl ether.

Examples of the monoamine include as a primary amine such as butylamine or cyclohexylamine; and a secondary amine such as diethylamine, dibutylamine or dicyclohexylamine.

Examples of the monocarboxylic acid include formic acid, acetic acid, propionic acid, isovaleric acid, hexanoic acid, lauric acid, myristic acid, palmitic acid, stearic acid, arachic acid, oleic acid, linoleic acid and linolenic acid.

Examples of the acid anhydride include phthalic anhydride, acetic anhydride, succinic anhydride, maleic anhydride and benzoic anhydride.

These may be used alone or in combination of two or more.

$R^2$ comprises a group represented by the following formula (i), which is a divalent residue of 2,4'-diphenylmethane diisocyanate having isocyanate groups removed therefrom, and a group represented by the following formula (ii), which is a divalent residue of 4,4'-diphenylmethane diisocyanate having isocyanate groups removed therefrom.

The group represented by the formula (i) has a non-linear structure, and it is therefore surmised that the structure becomes steric hindrance with respect to the adjacent carbodiimide group, and suppresses the gelation of the polycarbodiimide compound and reduces the crystallinity. It is surmised that the polycarbodiimide compound of the present invention is thereby excellent in storage stability and has a high solubility in a solvent. Moreover, when the polycarbodiimide compound of the present invention is used as a curing agent for epoxy resins or the like, it is surmised that the reactivity at low temperature can be suppressed.

In the polycarbodiimide compound of the present invention, the proportion of the groups represented by the formula (i) relative to all the $R^2$ groups is 30 to 70 mol %; and the proportion of the groups represented by the formula (ii) relative to all the $R^2$ groups is 30 to 70 mol %. When the proportion of the group represented by the formula (i) is less than 30 mol %, the polycarbodiimide compound is likely to gelate and may be reduced in storage stability and solubility in a solvent, whereas when it exceeds 70 mol %, the reactivity is lowered due to the too large steric hindrance and the desired performance may not be obtained when an epoxy resin is cured therewith. From these viewpoints, for $R^2$ in the polycarbodiimide compound, the proportion of the group represented by the formula (i) is preferably 40 to 65 mol % and is more preferably 50 to 60 mol %, and the proportion of the group represented by the formula (ii) is preferably 35 to 60 mol % and is more preferably 40 to 50 mol %.

R² comprises each of a group represented by the formula (i), which is a divalent residue of 2,4'-diphenylmethane diisocyanate having isocyanate groups removed therefrom, and a group represented by the formula (ii), which is a divalent residue of 4,4'-diphenylmethane diisocyanate having isocyanate groups removed therefrom, in the proportion in the above-described range, and R² may comprise a residue of another diisocyanate compound having an isocyanate group removed therefrom as long as it does not impair the effects of the present invention. Examples of another diisocyanate compound include 2,4-tolylene diisocyanate, 2,6-tolylene diisocyanate, tolidine diisocyanate, phenylene diisocyanate, hexamethylene diisocyanate, norbornane diisocyanate, xylylene diisocyanate, isophorone diisocyanate and naphthylene diisocyanate.

X¹ and X² each represent a group formed by the reaction of the organic compound and isocyanate, and X¹ and X² may be the same as or different from each other. For example, when the organic compound is a monoisocyanate, X¹ and X² are groups represented by the following formula (I); when the organic compound is a monoalcohol, X¹ and X² are groups represented by the following formula (II); when the organic compound is a monoamine, X¹ and X² are groups represented by the following formula (III); when the organic compound is a monocarboxylic acid, X¹ and X² are groups represented by the following formula (IV); and when the organic compound is an acid anhydride, X¹ and X² are groups represented by the following formula (V).

[Formula 5]

(I)

[Formula 6]

(II)

[Formula 7]

(III)

[Formula 8]

(IV)

[Formula 9]

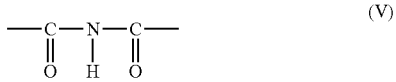

(V)

In the general formula (1), n represents an integer of 2 to 50. If n is less than 2, the crosslinkability may be inferior when the polycarbodiimide compound is used as a curing agent for epoxy resins or the like, whereas if n exceeds 50, the polycarbodiimide compound is likely to gelate and may be reduced in handling properties. From these viewpoints, n is preferably an integer of 3 to 40, more preferably an integer of 4 to 30 and still more preferably an integer of 5 to 20.

The polycarbodiimide compound of the present invention is preferably a polycarbodiimide compound represented by the following general formula (2) which is a compound represented by the general formula (1) wherein X¹ and X² each are groups represented by the formula (I).

[Formula 9]

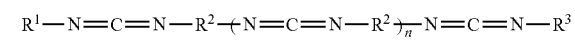

(2)

(Method for Producing Polycarbodiimide Compound)

The polycarbodiimide compound of the present invention can be produced by a known method.

Examples of the method include: (i) a method comprising subjecting a diisocyanate to a carbodiimidization reaction in the presence of a catalyst to obtain an isocyanate-terminated polycarbodiimide, and then adding an organic compound having one isocyanate-reactive functional group to the isocyanate-terminated polycarbodiimide to perform an end-capping reaction; (ii) a method comprising subjecting a diisocyanate and an organic compound having one isocyanate-reactive functional group to a carbodiimidization reaction and an end-capping reaction in the presence of a catalyst; and (iii) a method comprising reacting a diisocyanate and an organic compound having one isocyanate-reactive functional group followed by addition of a catalyst thereto and then performing a carbodiimidization reaction and an end-capping reaction.

In the present invention, the polycarbodiimide compound is preferably produced by the method of (ii) from a viewpoint of controlling the number of n in the general formula (1).

Specific examples of the diisocyanate are as described above.

In the present invention, the diisocyanate to be used comprises 30 to 60 mol % of 2,4'-diphenylmethane diisocyanate (2,4'-MDI) and 40 to 70 mol % of 4,4'-diphenylmethane diisocyanate (4,4'-MDI). By appropriately adjusting the proportion of 2,4'-MDI and the proportion of 4,4'-MDI in the diisocyanate, the proportion of the groups represented by the formula (i) relative to all the R² groups in the compound represented by the general formula (1) and the proportion of the groups represented by the formula (ii) relative to all the R² groups in the compound represented by the general formula (1) can each be within the above range.

When the proportion of 2,4'-MDI in the diisocyanate is less than 30 mol %, the resulting polycarbodiimide compound is likely to gelate and may be reduced in storage stability and solubility in a solvent, whereas when it exceeds 60 mol %, the reactivity is lowered and the desired polycarbodiimide compound may not be obtained. From these viewpoints, the proportion of 2,4'-MDI in the diisocyanate to be used is preferably 40 to 65 mol %, more preferably 40 to 60 mol % and still more preferably 50 to 60 mol %, whereas, the proportion of 4,4'-MDI in the diisocyanate to be used is preferably 35 to 60 mol %, more preferably 40 to 60 mol %, and still more preferably 40 to 50 mol %.

Examples of the catalyst used for the carbodiimidization reaction can include phosphorene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide and their 3-phospholene isomers. Among them, 3-methyl-1-phenyl-2-phospholene-1-oxide is preferred from the viewpoint of the reactivity.

The amount of the catalyst used is usually 0.01 to 5.0 parts by mass relative to 100 parts by mass of the diisocyanate.

The carbodiimidization reaction can be carried out without any solvent or in a solvent. Example of the solvent that can be used include a cycloaliphatic ether such as tetrahydrofuran, 1,3-dioxane and dioxolane; an aromatic hydrocarbon such as benzene, toluene, xylene or ethylbenzene; a halogenated hydrocarbon such as chlorobenzene, dichlorobenzene, trichlorobenzene, perchlene, trichloroethane and dichloroethane; and cyclohexanone. These may be used alone or in combination of two or more.

The conditions for the carbodiimidization reaction are not particularly limited. However, when any solvent is not used, the carbodiimidization reaction is performed preferably at a temperature of 40 to 250° C., more preferably 40 to 200° C. and still more preferably 40 to 150° C., and preferably for 1 to 30 hours, more preferably for 1 to 20 hours and still more preferably for 1 to 10 hours. When the carbodiimidization reaction is performed in a solvent, it is preferably performed at a temperature of 40° C. to the boiling point of the solvent.

By reacting the diisocyanate and/or the isocyanate-terminated polycarbodiimide with the organic compound having one isocyanate-reactive functional group, the isocyanate group contained in the diisocyanate and/or the isocyanate group contained in the isocyanate-terminated polycarbodiimide are end-capped with the organic compound.

Specific examples of the organic compound are as described above.

The amount of the organic compound to be added may be appropriately adjusted so that in the general formula (1), n is within the above-described range.

The thus obtained polycarbodiimide compound has a high solubility in a solvent and is excellent in storage stability. Moreover, when the polycarbodiimide compound is used as a curing agent for epoxy resins or the like, it has a suppressed reactivity at a low temperature, and a thermosetting resin composition containing the polycarbodiimide compound can be excellent in handling properties, heat resistance and moldability.

[Thermosetting Resin Composition]

The thermosetting resin composition of the present invention comprises a thermosetting resin and the above-mentioned polycarbodiimide compound.

Examples of the thermosetting resin to be used in the present invention include a resin having an epoxy group, a carboxyl group, an amino group or a hydroxyl group. Among them, from the viewpoint of handling properties and heat resistance, an epoxy resin having two or more epoxy groups in one molecule is preferred.

(Epoxy Resin)

The epoxy resin is not particularly limited as long as it has two or more epoxy groups in one molecule, and any known epoxy resin can be used. Example of the epoxy resin include a bisphenol A type epoxy resin, a bisphenol F type epoxy resin, a phenol novolac type epoxy resin, a cresol novolac type epoxy resin, a naphthalene type epoxy resin, a biphenyl type epoxy resin and a cyclopentadiene type epoxy resin. Among them, an epoxy resin liquid at room temperature is preferred. These resins may be used alone or in combination of two or more.

(Polycarbodiimide Compound)

The polycarbodiimide compound of the present invention is used as a curing agent for epoxy resins or the like. When the polycarbodiimide compound is used as a curing agent for epoxy resins or the like, it has a suppressed reactivity at a low temperature, and can suppress thickening of a thermosetting resin composition to improve its handling properties and moldability. Moreover, the polycarbodiimide compound can improve heat resistance of a thermosetting resin composition.

The polycarbodiimide compound is as described above in the section of [Polycarbodiimide Compound].

From the viewpoint of heat resistance, the amount of the polycarbodiimide compound contained in the thermosetting resin composition is such that the carbodiimide group in the polycarbodiimide compound has preferably 0.1 to 2.0 numerical equivalents relative to the epoxy group in the epoxy resin and more preferably 0.2 to 1.5 numerical equivalents.

The total content of the thermosetting resin and the polycarbodiimide compound in the total amount of the thermosetting resin composition (excluding a filler) is preferably 80% by mass or more, more preferably 90% by mass or more and still more preferably 95 mass % or more.

(Curing Accelerator)

The thermosetting resin composition of the present invention may further comprise a curing accelerator in order to accelerate the curing reaction of the epoxy resin and the polycarbodiimide compound.

The curing accelerator is not particularly limited in its type as long as it accelerates the curing reaction, and examples thereof include an imidazole compound, an amine compound and an organic phosphorus compound. Among them, the imidazole compound is preferably used.

The amount of the curing accelerator to be added is preferably 0.1 to 5 parts by mass and more preferably 0.1 to 3 parts by mass relative to 100 parts by mass of the epoxy resin.

The total content of the thermosetting resin, the polycarbodiimide compound and the curing accelerator in the total amount of the thermosetting resin composition (excluding a filler) is preferably 80% by mass or more, more preferably 90% by mass or more and still more preferably 95 mass % or more, for example 100% by mass.

(Other Components)

The thermosetting resin composition of the present invention may contain any additive as long as it does not impair the effects of the present invention. Specific examples of the additive include a coupling agent, a filler, a lubricant, a colorant, a flame retardant and an anti-foaming agent.

By using the above-mentioned polycarbodiimide compound as a curing agent for epoxy resins, the thermosetting resin composition of the present invention is suppressed in thickening and is also excellent in handling properties and moldability as well as the cured product obtained therefrom is excellent in heat resistance, and can therefore be suitably used for an electronic substrate, a sealant and the like.

EXAMPLES

Hereinafter, the present invention will be specifically described with reference to Examples and Comparative Examples, but the present invention is not intended to be limited to embodiments described in Examples.

The raw materials used in Examples 1 to 5 and Comparative Examples 1 to 3 are as follows.

<Diisocyanate>

Millionate® NM: monomeric MDI manufactured by Tosoh Corporation (2,4'-MDI: 4,4'-MDI=54: 46)

Millionate® MT: monomeric MDI manufactured by Tosoh Corporation (4,4'-MDI)

<Organic Compound Having One Isocyanate-Reactive Functional Group (Monoisocyanate)>
Phenyl isocyanate
(Carbodiimidization Catalyst)
3-Methyl-1-phenyl-2-phospholene-1-oxide
<Solvent>
Tetrahydrofuran (THF)

Example 1: Synthesis of Polycarbodiimide Compound (a) [in Raw Diisocyanate Compound, 2,4'-MDI: 54%, 4,4'-MDI: 46%]

A reaction vessel equipped with a reflux condenser and a stirrer was charged with 100 parts by mass of a mixture of 54% of 2,4'-diphenylmethane diisocyanate (2,4'-MDI) and 46% of 4,4'-diphenylmethane diisocyanate (4,4'-MDI) (Millionate® NM; monomeric MDI manufactured by Tosoh Corporation), as a diisocyanate compound; 6.3 parts by mass of phenyl isocyanate as an organic compound having one isocyanate-reactive functional group; and 0.6 parts by mass of 3-methyl-1-phenyl-2-phospholene-1-oxide as a carbodiimidization catalyst, and the mixture was stirred under a nitrogen flow at 100° C. for 2 hours. It was confirmed by infrared (IR) spectrum measurement that the absorption peak attributed to an isocyanate group at a wavelength of about 2270 cm$^{-1}$ almost disappeared. A polycarbodiimide compound (a) having a polymerization degree of 16 was obtained.

As used herein, the "polymerization degree" refers to n in the general formula (1) as described above.

Example 2: Synthesis of Polycarbodiimide Compound (b) [2,4'-MDI: 54%]

A polycarbodiimide compound (b) having a polymerization degree of 11 was obtained in the same manner as in Example 1 except that the amount of phenyl isocyanate to be added was changed to 9.5 parts by mass.

Example 3: Synthesis of Polycarbodiimide Compound (c) [2,4'-MDI: 54%]

A polycarbodiimide compound (c) having a polymerization degree of 6 was obtained in the same manner as in Example 1 except that the amount of phenyl isocyanate to be added was changed to 15.8 parts by mass.

Example 4: Synthesis of Polycarbodiimide Compound (d) [2,4'-MDI: 38%]

A polycarbodiimide compound (d) having a polymerization degree of 11 was obtained in the same manner as in Example 2 except that 70.4 parts by mass of a mixture of 54% of 2,4'-MDI and 46% of 4,4'-MDI (Millionate® NM: monomeric MDI manufactured by Tosoh Corporation) and 29.6 parts by mass of 4,4'-MDI (Millionate® MT: monomeric MDI manufactured by Tosoh Corporation) were used as diisocyanate compounds.

Example 5: Synthesis of Polycarbodiimide Compound (e) [2,4'-MDI: 54%]

A polycarbodiimide compound (e) having a polymerization degree of 16 was obtained in the same manner as in Example 1 except that 300 parts by mass of tetrahydrofuran (THF) was used as a solvent and the mixture was stirred under reflux of the solvent.

Comparative Example 1: Synthesis of Polycarbodiimide Compound (f) [4,4'-MDI: 100%]

A reaction vessel equipped with a reflux condenser and a stirrer was charged with 100 parts by mass of 4,4'-MDI (Millionate® MT: monomeric MDI manufactured by Tosoh Corporation) as a diisocyanate compound; 9.5 parts by mass of phenyl isocyanate as an organic compound having one isocyanate-reactive functional group; and 0.6 parts by mass of 3-methyl-1-phenyl-2-phospholene-1-oxide as a carbodiimidization catalyst, and the mixture was stirred under a nitrogen flow at 100° C. for 2 hours but gelated during the reaction.

Comparative Example 2: Synthesis of Polycarbodiimide Compound (g) [4,4'-MDI: 100%]

A reaction vessel equipped with a reflux condenser and a stirrer was charged with 100 parts by mass of 4,4'-MDI (Millionate® MT: monomeric MDI manufactured by Tosoh Corporation) as a diisocyanate compound; 9.5 parts by mass of phenyl isocyanate as an organic compound having one isocyanate-reactive functional group; 300 parts by mass of tetrahydrofuran (THF) as a solvent; and 0.6 parts by mass of 3-methyl-1-phenyl-2-phospholene-1-oxide as a carbodiimidization catalyst, and the mixture was stirred under a nitrogen flow and under reflux of the solvent for 3 hours. It was confirmed by infrared (IR) spectrum measurement that the absorption peak attributed to an isocyanate group at a wavelength of about 2270 cm$^{-1}$ almost disappeared, and tetrahydrofuran was then evaporated with a dryer at 50° C. to obtain a polycarbodiimide compound (g) having a polymerization degree of 11.

Comparative Example 3: Synthesis of Polycarbodiimide Compound (h) [2,4'-MDI: 19%]

A polycarbodiimide compound (h) having a polymerization degree of 11 was obtained in the same manner as in Comparative Example 2 except that 35.2 parts by mass of a mixture of 54% of 2,4'-MDI and 46% of 4,4'-MDI (Millionate® NM: monomeric MDI manufactured by Tosoh Corporation) and 64.8 parts by mass of 4,4'-MDI (Millionate® MT: monomeric MDI manufactured by Tosoh Corporation) were used as diisocyanate compounds and the reaction temperature was changed to 100° C.

<Evaluation Items>
(1) Solubility in Solvent

Fifty parts by mass of each of the polycarbodiimide compounds obtained in Examples 1 to 5 and Comparative Examples 2 and 3 was added to 100 parts by mass of tetrahydrofuran and stirred at room temperature (25° C.) for 10 minutes. The polycarbodiimide compound that was dissolved in tetrahydrofuran to provide a uniform solution was evaluated as "soluble", and the polycarbodiimide compound that was not completely dissolved in tetrahydrofuran was evaluated as "insoluble".

In addition, the solubility of the polycarbodiimide compound in a solvent was evaluated in the same manner except that tetrahydrofuran was changed to each of cyclohexanone and toluene. The results are shown in Table 1.

(2) Storage Stability Test 1: Storage Stability in Solvent (Toluene)

Each of the polycarbodiimide compounds obtained in Examples 1 to 5 and Comparative Example 3 were dissolved in toluene so as to have a concentration of 50% by weight to obtain a polycarbodiimide solution. This polycarbodiimide solution was placed in a sealed container, allowed to stand at an ordinary temperature (20° C.), and the time until gelation (until the precipitation of solids was visually observed) was measured. The results are shown in Table 1.

The longer the time until gelation, the better the storage stability of the polycarbodiimide compound.

(3) Storage Stability Test 2: Measurement of Gel Time at 100° C.

Each of the polycarbodiimide compounds obtained in Examples 1 to 5 and Comparative Example 3 was pulverized with a pulverizer, placed in an aluminum petri dish and placed on a hot plate heated to 100° C. While holding the aluminum petri dish on the hot plate, the contents therein were stirred with a spatula, and the time until gelation (until stirring with the spatula was impossible) was measured. The results are shown in Table 1.

The longer the time until gelation, the better the storage stability of the polycarbodiimide compound.

<Curing Agent>
Polycarbodiimide compound (a) synthesized in Example 1
Polycarbodiimide compound (b) synthesized in Example 2
Polycarbodiimide compound (c) synthesized in Example 3
Polycarbodiimide compound (d) synthesized in Example 4
Polycarbodiimide compound (g) synthesized in Comparative Example 2
Polycarbodiimide compound (h) synthesized in Comparative Example 3
<Curing Accelerator>
CUREZOL TBZ: an imidazole-based epoxy resin curing accelerator manufactured by SHIKOKU CHEMICALS CORPORATION Example 6

Hundred parts by mass of an epoxy resin (jER® 828: a bisphenol A type epoxy resin manufactured by Mitsubishi

TABLE 1

| | | Unit | Example 1 | Example 2 | Example 3 | Example 4 | Example 5 | Comparative Example 1 | Comparative Example 2 | Comparative Example 3 |
|---|---|---|---|---|---|---|---|---|---|---|
| Diisocyanate | Millionate NM (2,4'-MDI:4,4'-MDI-54:46) | Parts by mass | 100 | 100 | 100 | 70.4 | 100 | — | — | 35.2 |
| | Millionate MT (4,4'-MDI) | Parts by mass | — | — | — | 29.6 | — | 100 | 100 | 64.8 |
| Ratio of 2,4'-MDI to 4,4'-MDI (2,4'-MDI:4,4'-MDI) | | — | 54:46 | 54:46 | 54:46 | 38:62 | 54:46 | 0:100 | 0:100 | 19:81 |
| Monoisocyanate | Phenyl isocyanate | Parts by mass | 6.3 | 9.5 | 15.8 | 9.5 | 6.3 | 9.5 | 9.5 | 9.5 |
| Carbodiimidization catalyst | 3-Methyl-1-phenyl-2-phospholene-1-oxide | Parts by mass | 0.6 | 0.6 | 0.6 | 0.6 | 0.6 | 0.6 | 0.6 | 0.6 |
| Solvent | Tetrahydrofuran (THF) | Parts by mass | — | — | — | — | — | — | 300 | 300 |
| THF evaporation | | — | — | — | — | — | — | Carried out | — | Carried out | Carried out |
| Polymerization degree | | — | 16 | 11 | 6 | 11 | 16 | Gelation | 11 | 11 |
| Solubility in solvent | Tetrahydrofuran | — | Soluble | Soluble | Soluble | Soluble | Soluble | Insoluble*[1] | Insoluble | Soluble |
| | Cyclohexanone | — | Soluble | Soluble | Soluble | Soluble | Soluble | Insoluble*[1] | Insoluble | Soluble |
| | Touluene | — | Soluble | Soluble | Soluble | Soluble | Soluble | Insoluble*[1] | Insoluble | Soluble |
| Storage stability test 1 | Storage stability in toluene | Days | 18 | 21 | 27 | 8 | 18 | — | — | 3 |
| Storage stability test 2 | Measurement of gel time at 100° C. | Seconds | 216 | 268 | 302 | 210 | 214 | — | — | 121 |

*[1]In Comparative Example 1, the reaction was performed without any solvent using only 4,4'-MDI as a diisocyanate compound, and gelation occurred during the reaction. The matter formed by the gelation was insoluble in the solvent.

The polycarbodiimide compounds obtained in Examples 1 to 5 dissolved in any solvent and were excellent in storage stability in toluene. On the other hand, the polycarbodiimide compound synthesized in tetrahydrofuran using only 4,4'-MDI as a diisocyanate compound did not dissolve in any solvent (Comparative Example 2). The polycarbodiimide compound having the proportion of 2,4'-MDI less than that in the range defined in the present invention dissolved in any solvent, but its storage stability in toluene was low (Comparative Example 3).

The raw materials used in Examples 6 to 13 and Comparative Examples 4 and 5 are as follows.
<Epoxy Resin>
jER® 828: a bisphenol A type epoxy resin manufactured by Mitsubishi Chemical Corporation
NC-3000: a biphenyl type epoxy resin manufactured by Nippon Kayaku Co., Ltd.

Chemical Corporation) and 91 parts by mass of the polycarbodiimide compound (a) of Example 1 pulverized with a pulverizer were placed in an aluminum petri dish and placed on a hot plate heated to 100° C. The resin was mixed with a spatula to obtain a polycarbodiimide compound-containing resin composition.

Examples 7 to 9 and Comparative Example 4

Each of polycarbodiimide compound-containing resin compositions of Examples 7 to 9 and Comparative Example 4 was obtained in the same manner as in Example 6 except that the polycarbodiimide compound in Example 6 was changed to that described in Table 2. In Table 2, a blank represents no compounding.

Example 10

Hundred parts by mass of an epoxy resin (NC-3000: a biphenyl type epoxy resin manufactured by Nippon Kayaku Co., Ltd.), 73.3 parts by mass of the polycarbodiimide compound (a) of Example 1 pulverized with a pulverizer, and 0.2 parts by mass of a curing accelerator (CUREZOL TBZ: an imidazole-based epoxy resin curing accelerator manufactured by SHIKOKU CHEMICALS CORPORATION) were placed in an aluminum petri dish and placed on a hot plate heated to 100° C. The resin was mixed to obtain a polycarbodiimide compound-containing resin composition.

Examples 11 to 13 and Comparative Example 5

Each of polycarbodiimide compound-containing resin compositions of Examples 11 to 13 and Comparative Example 5 was obtained in the same manner as in Example 10 except that the polycarbodiimide compound in Example 10 was changed to that described in Table 3. In Table 3, a blank represents no compounding.

Example 14

Hundred parts by mass of an epoxy resin (jER® 828: a bisphenol A type epoxy resin manufactured by Mitsubishi Chemical Corporation) and 91 parts by mass of the polycarbodiimide compound (a) of Example 1 pulverized with a pulverizer were dissolved in 200 parts by mass of tetrahydrofuran, cast on a PET release film and dried 100° C. for 5 minutes to obtain a polycarbodiimide compound-containing resin composition.

Examples 15 to 17

Each of polycarbodiimide compound-containing resin compositions of Examples 15 to 17 was obtained in the same manner as in Example 14 except that the polycarbodiimide compound in Example 14 was changed to that described in Table 4. In Table 4, a blank represents no compounding.

<Evaluation Items>
(4) Curability Test: Measurement of Gel Time at 120° C. and 185° C.
(4-1) Measurement of Gel Time at 120° C.

Each of the polycarbodiimide compound-containing resin compositions obtained in Examples 6 to 13 and Comparative Example 4 and 5 was pulverized with a pulverizer and placed in an aluminum petri dish and placed on a hot plate heated to 120° C. While holding the aluminum petri dish on the hot plate, the contents therein were stirred with a spatula, and the time until gelation (until stirring with the spatula was impossible) was measured. The results are shown in Table 2 and Table 3.

The longer the time until gelation, the better the reactivity of the polycarbodiimide compound at a low temperature suppressed.

(4-2) Measurement of Gel Time at 185° C.

The time until gelation was measured in the same way as the procedure in (4-1) above except that the temperature of the hot plate was changed to 185° C. The results are shown in Table 2 and Table 3.

The gel time measured at a temperature of 185° C. represents the curing reactivity when a polycarbodiimide compound is used as a curing agent.

(5) Glass Transition Temperature

Each of the polycarbodiimide compound-containing resin compositions obtained in Examples 6 to 17 and Comparative Examples 4 and 5 was heated at 180° C. for 2 hours to obtain a shaped product (2 cm in length×1 cm in width×100 μm in thickness). For each of the obtained shaped products, the glass transition temperature was measured using a dynamic viscoelasticity measuring device (DMS6100, manufactured by Seiko Instruments Inc.) at a rate of temperature rise of 10° C./min. The results are shown in Tables 2 to 4.

It can be expected that the higher the glass transition temperature, the higher the reliability due to the higher heat resistance and the less change in properties at a high temperature.

TABLE 2

|  |  | Unit | Example 6 | Example 7 | Example 8 | Example 9 | Comparative Example 4 |
|---|---|---|---|---|---|---|---|
| Epoxy resin | jER828 | Parts by mass | 100 | 100 | 100 | 100 | 100 |
| Curing agent | Polycarbodiimide compound (a) | Parts by mass | 91 |  |  |  |  |
|  | Polycarbodiimide compound (b) | Parts by mass |  | 91 |  |  |  |
|  | Polycarbodiimide compound (c) | Parts by mass |  |  | 91 |  |  |
|  | Polycarbodiimide compound (d) | Parts by mass |  |  |  | 91 |  |
|  | Polycarbodiimide compound (h) | Parts by mass |  |  |  |  | 91 |
| Curability test | Measurement of gel time (120° C.) | Seconds | 557 | 623 | 784 | 597 | 189 |
|  | Measurement of gel time (185° C.) | Seconds | 282 | 360 | 474 | 290 | 120 |
| Glass transition temperature |  | ° C. | 251 | 250 | 250 | 252 | 255 |

The gel time at 120° C. of the polycarbodiimide compound-containing resin compositions obtained in Examples 6 to 9 were 557 to 784 seconds, and each of them was longer than that of the polycarbodiimide compound-containing resin composition of Comparative Example 4, indicating that the reactivity of each of the polycarbodiimide compounds at a low temperature is suppressed. Moreover, the gel time at 185° C. of each polycarbodiimide compound-containing resin composition was not too long, indicating that each of the polycarbodiimide compounds has a sufficient curing reactivity. In addition, each of the shaped products of the resin compositions had a high glass transition temperature of 250° C. or more, indicating that it is excellent in heat resistance.

TABLE 3

|  | | Unit | Example 10 | Example 11 | Example 12 | Example 13 | Comparative Example 5 |
|---|---|---|---|---|---|---|---|
| Epoxy resin | NC-3000 | Parts by mass | 100 | 100 | 100 | 100 | 100 |
| Curing agent | Polycarbodiimide compound (a) | Parts by mass | 73.3 | | | | |
|  | Polycarbodiimide compound (b) | Parts by mass | | 73.3 | | | |
|  | Polycarbodiimide compound (c) | Parts by mass | | | 73.3 | | |
|  | Polycarbodiimide compound (d) | Parts by mass | | | | 73.3 | |
|  | Polycarbodiimide compound (g) | Parts by mass | | | | | 73.3 |
| Curing accelerator | CUREZOL TBZ | Parts by mass | 0.2 | 0.2 | 0.2 | 0.2 | 0.2 |
| Curability test | Measurement of gel time (120° C.) | Seconds | 570 | 668 | 795 | 503 | 201 |
|  | Measurement of gel time (185° C.) | Seconds | 337 | 391 | 492 | 296 | 130 |
| Glass transition temperature | | ° C. | 272 | 270 | 269 | 270 | 270 |

The gel time at 120° C. of the polycarbodiimide compound-containing resin compositions obtained in Examples 10 to 13 were 503 to 795 seconds, and each of them was longer than that of the polycarbodiimide compound-containing resin composition of Comparative Example 5, indicating that the reactivity of each of the polycarbodiimide compounds at a low temperature is suppressed. Moreover, the gel time at 185° C. of each polycarbodiimide compound-containing resin composition was not too long, indicating that each of the polycarbodiimide compounds has a sufficient curing reactivity. In addition, each of the shaped products of the resin compositions had a high glass transition temperature of 260° C. or more, indicating that it is excellent in heat resistance.

TABLE 4

|  | | Unit | Example 14 | Example 15 | Example 16 | Example 17 |
|---|---|---|---|---|---|---|
| Epoxy resin | jER828 | Parts by mass | 100 | 100 | 100 | 100 |
| Curing agent | Polycarbodiimide compound (a) | Parts by mass | 91 | | | |
|  | Polycarbodiimide compound (b) | Parts by mass | | 91 | | |
|  | Polycarbodiimide compound (c) | Parts by mass | | | 91 | |
|  | Polycarbodiimide compound (d) | Parts by mass | | | | 91 |
| Glass transition temperature | | ° C. | 251 | 250 | 250 | 252 |

The results of Examples 14 to 17 show that a cured product having a high glass transition temperature can be obtained even when the polycarbodiimide compound of the present invention is dissolved in a solvent.

The invention claimed is:

1. A polycarbodiimide compound represented by the following general formula (1):

[Formula 1]

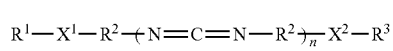

(1)

wherein $R^1$ and $R^3$ each represent a residue of an organic compound having one isocyanate-reactive functional group but excluding the isocyanate-reactive functional group, and $R^1$ and $R^3$ may be the same as or different from each other; $R^2$ comprises a group represented by the following formula (i), which is a divalent residue of 2,4'-diphenylmethane diisocyanate having isocyanate groups removed therefrom, and a group represented by the following formula (ii), which is a divalent residue of 4,4'-diphenylmethane diisocyanate having isocyanate groups removed therefrom; the proportion of the groups represented by the formula (i) relative to all the $R^2$ groups in the polycarbodiimide compound is FM 50 to 65 mol %, and the proportion of the groups represented by the formula (ii) relative to all the $R^2$ groups in the polycarbodiimide compound is 35 to 50 mol %; $X^1$ and $X^2$ each represent a group formed by the reaction of the organic compound and isocyanate, and $X^1$ and $X^2$ may be the same as or different from each other; and n represents an integer of 2 to 50,

[Formula 2]

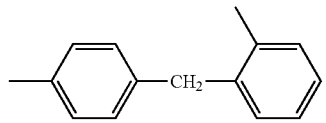

(i)

[Formula 3]

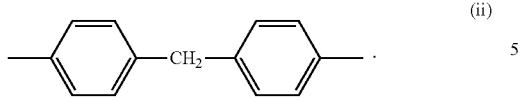 (ii)

2. The polycarbodiimide compound according to claim 1, wherein the proportion of the groups represented by the formula (i) relative to all the $R^2$ groups in the polycarbodiimide compound is 50 to 60 mol %; and the proportion of the groups represented by the formula (ii) relative to all the $R^2$ groups in the polycarbodiimide compound is 40 to 50 mol %.

3. The polycarbodiimide compound according to claim 1, wherein the organic compound having one isocyanate-reactive functional group is at least one selected from the group consisting of a monoisocyanate, a monoalcohol, a monoamine, a monocarboxylic acid and an acid anhydride.

4. The polycarbodiimide compound according to claim 3, wherein the organic compound having one isocyanate-reactive functional group is a monoisocyanate.

5. A thermosetting resin composition comprising an epoxy resin and the polycarbodiimide compound according to claim 1.

\* \* \* \* \*